United States Patent [19]
Yamashita et al.

[11] Patent Number: 5,565,743
[45] Date of Patent: Oct. 15, 1996

[54] LIGHTING CIRCUIT FOR DISCHARGE LAMP

[75] Inventors: Masayasu Yamashita; Goichi Oda, both of Shimizu, Japan

[73] Assignee: Koito Manufacturing Co., Ltd., Tokyo, Japan

[21] Appl. No.: 521,577

[22] Filed: Aug. 30, 1995

[30] Foreign Application Priority Data

Aug. 30, 1994 [JP] Japan ................................. 6-227427

[51] Int. Cl.$^6$ ................................................ G05F 1/00
[52] U.S. Cl. ........................ 315/310; 315/308; 315/82; 315/DIG. 5; 315/DIG. 7
[58] Field of Search ............................... 315/291, 209 R, 315/307, 308, 224, 310, 77, 82, DIG. 5, DIG. 7

[56] References Cited

U.S. PATENT DOCUMENTS

| | | | |
|---|---|---|---|
| 4,240,009 | 12/1980 | Paul | 315/224 |
| 4,724,360 | 2/1988 | Luursema | 315/244 |
| 5,068,570 | 11/1991 | Oda et al. | 315/128 |
| 5,140,229 | 8/1992 | Yagi et al. | 315/307 |
| 5,142,203 | 8/1992 | Oda et al. | 315/308 |
| 5,151,631 | 9/1992 | Oda et al. | 315/127 |
| 5,198,728 | 3/1993 | Bernitz et al. | 315/307 |
| 5,212,428 | 5/1993 | Sasaki et al. | 315/308 |
| 5,278,452 | 1/1994 | Matsumoto et al. | 307/10.8 |
| 5,283,727 | 2/1994 | Kheraluwala et al. | 363/98 |
| 5,295,036 | 3/1994 | Yagi et al. | 361/79 |
| 5,449,973 | 9/1995 | Yamashita et al. | 315/82 |
| 5,450,305 | 9/1995 | Boys et al. | 363/24 |
| 5,514,935 | 5/1996 | Oda et al. | 315/82 |

FOREIGN PATENT DOCUMENTS

| | | |
|---|---|---|
| 3623306 | 2/1987 | Germany . |
| 4322139 | 1/1994 | Germany . |
| 4400093 | 7/1994 | Germany . |

*Primary Examiner*—Robert Pascal
*Assistant Examiner*—Haissa Philogene
*Attorney, Agent, or Firm*—Sughrue, Mion, Zinn, Macpeak & Seas

[57] ABSTRACT

A lighting circuit, which is lit with a voltage with a square wave, has a DC booster circuit, a bridge type DC-AC converter and an inductor provided at the subsequent stage of the DC-AC converter. A metal halide lamp is connected in series to the inductor. Another inductor and a capacitor are provided between the DC booster circuit and the DC-AC converter. A series circuit of a resistor and a diode is connected in parallel to the second inductor. This structure generates a resonance voltage having a high peak value to compensate for a re-ignition voltage of a discharge lamp which is produced when the polarity of the square-wave voltage is switched, thereby preventing the lighting failure of the discharge lamp immediately after the lighting starts.

11 Claims, 8 Drawing Sheets

Figure 9:
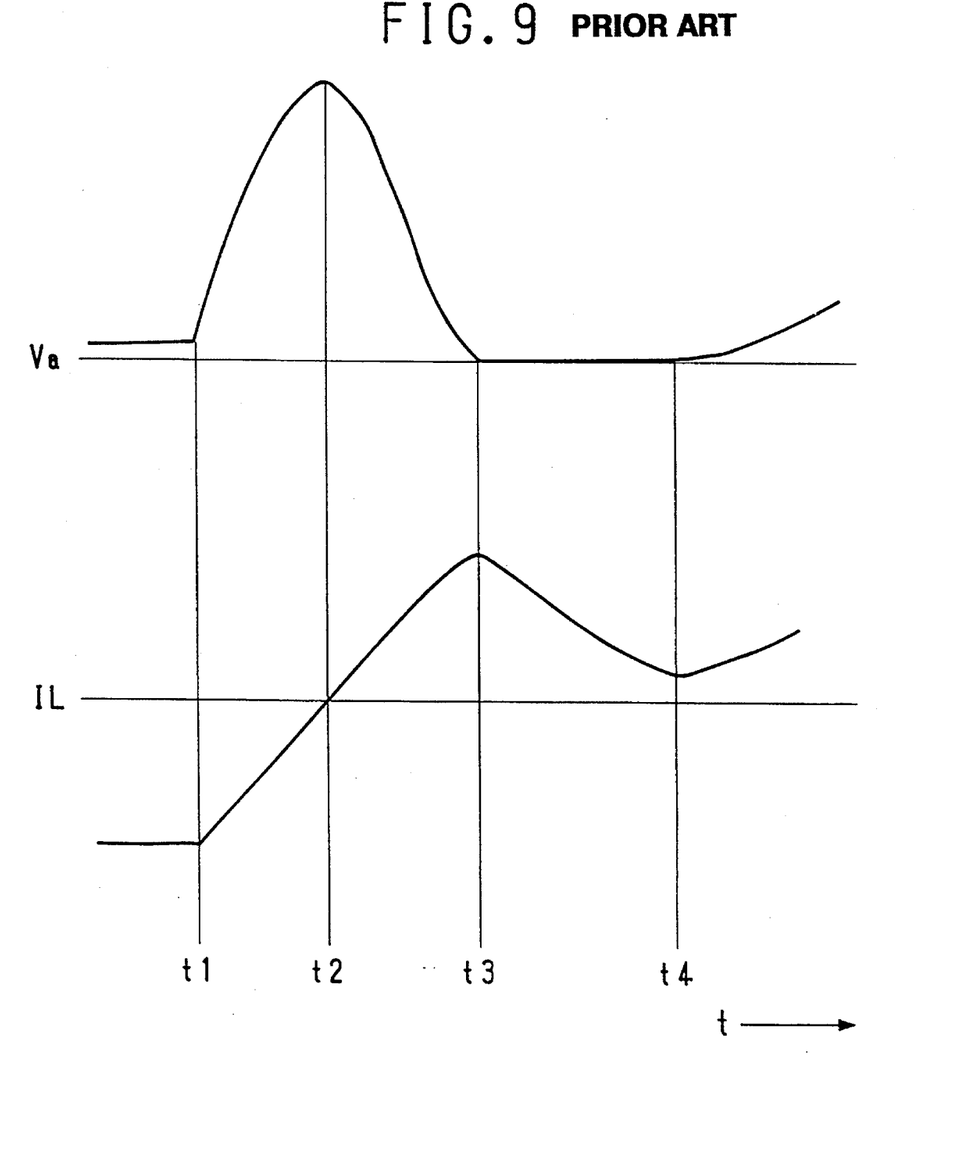
FIG. 9 is a schematic waveform chart for explaining the problems of the prior art.

2 rapidly falls close to zero, and "t4" is the point at which IL temporarily falls after t3.

As illustrated, Va temporarily shows the peak by the LC resonance but rapidly falls near zero by the reaction of the resonance, so that a sufficient voltage is not supplied to the lamp. As a result, the current IL which has risen to the peak at t3 after t2 temporarily drops at t4, at which the lighting failure of the lamp is likely to occur.

LIGHTING CIRCUIT FOR DISCHARGE LAMP

BACKGROUND OF THE INVENTION

1. Field of the Invention

The present invention relates to an improved and novel lighting circuit of a square-wave lighting type for a discharge lamp, which generates a resonance voltage having a high peak value to compensate for the re-ignition voltage of the discharge lamp that is produced at the time of inverting the polarity of a square wave, thereby preventing frequent lighting failure of the discharge lamp immediately after the activation of the discharge lamp.

2. Description of the Related Art

Recently, downsized metal halide lamps are receiving greater attention as a light source to take the place of an incandescent lamp. A known lighting circuit for a vehicular metal halide lamp is, for example, designed to use a DC power supply in such a way that a DC input voltage after being boosted is converted to an AC voltage of a square waveform which is in turn applied to the metal halide lamp.

When the polarity of a square wave to be supplied to a lamp is inverted, the re-ignition voltage of the lamp is produced. A circuit to compensate for the re-ignition voltage has been proposed which generates a resonance voltage with a high peak value, thereby preventing the lighting failure, flickering or the like of the lamp.

Figure 8:
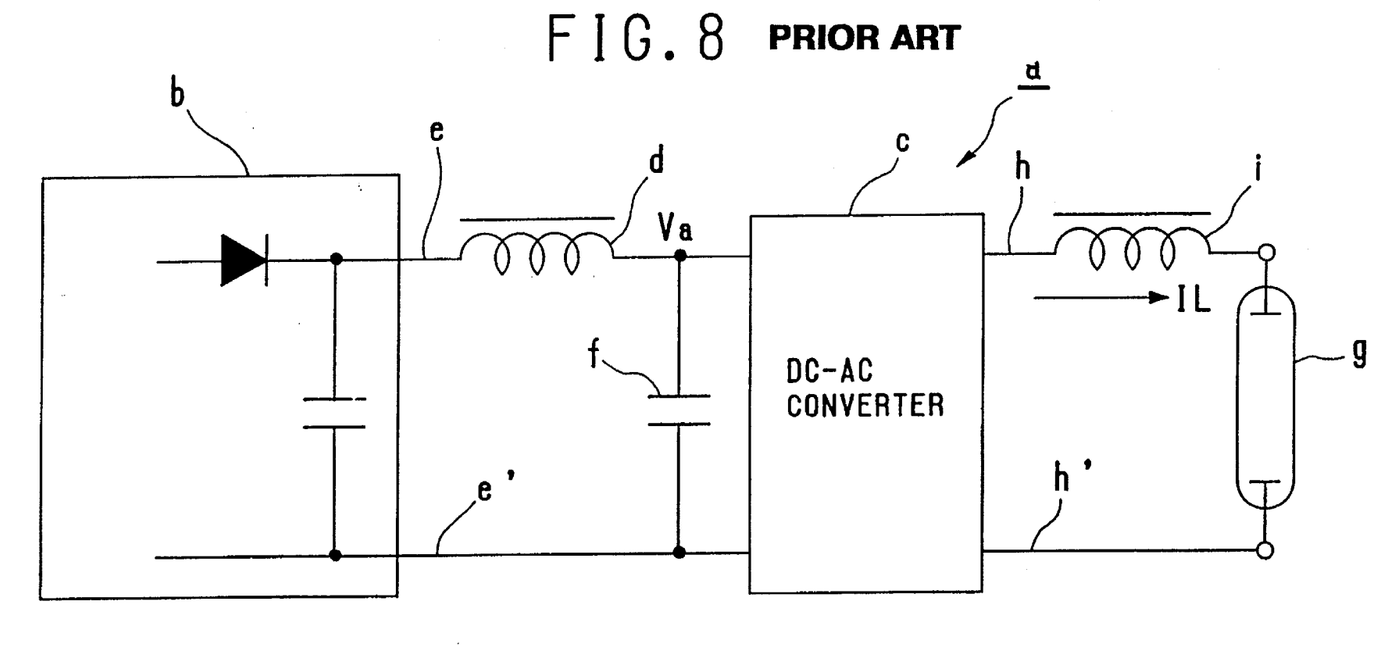
FIG. 8 is a diagram showing the essential portions of a conventional lighting circuit.

FIG. 8 shows the essential portions of such a circuit a. A DC power supply section b is provided to acquire the boosted output and/or stepped down output of the supply voltage from a battery (not shown).

A DC-AC converter c, provided at the subsequent stage of the DC power supply section b, converts the output of the DC power supply section b to an AC voltage of a square wave. The DC-AC converter c has a bridge structure comprising semiconductor switch elements.

An inductor d is provided on one (e) of connection lines e and e' which connect the DC power supply section b to the DC-AC converter c.

A capacitor f has one end connected to one end of the inductor d on the DC-AC converter side, and the other end connected to the connection line e'.

An inductor i is provided on one (h) of power supply lines h and h' which connect a metal halide lamp g to the DC-AC converter c.

In this circuit a, the output of the DC power supply section b is converted by the DC-AC converter c to a square-wave voltage which in turn is supplied to the metal halide lamp g via the inductor i. It is however possible to compensate for the re-ignition voltage of the lamp at the time of normal lighting as well as the initial stage of the lighting by using the peak voltage which is produced by the resonance of the inductor d and capacitor f.

When a voltage drop occurs after the LC resonance due to the reaction of the resonance in the above circuit structure, the lamp current temporarily decreases so that the lighting failure of the lamp is likely to occur.

FIG. 9 schematically shows the waveforms at the essential portions at the initial lighting stage of the lamp, and shows the relation between the potential (Va) between the inductor d and capacitor f and the current (IL) flowing across the inductor i. In the diagram, "t1" is the rise point of the square-wave voltage Va, "t2" is the point at which the polarity of IL is inverted, "t3" is the point at which Va

SUMMARY OF THE INVENTION

Accordingly, it is an objective of the present invention to provide a lighting circuit of a square-wave lighting type for a discharge lamp, which generates a resonance voltage having a high peak value to compensate for the re-ignition voltage of the discharge lamp that is produced at the time of inverting the polarity of a square wave, thereby preventing frequent lighting failure of the discharge lamp immediately after the activation of the discharge lamp.

To achieve this object, a lighting circuit for a discharge lamp according to this invention comprises a DC power supply circuit section including a smoothing capacitor; a bridge type DC-AC converter provided at a subsequent stage of the DC power supply circuit section; a first inductance element provided at a subsequent stage of the DC-AC converter with a discharge lamp connected in series to the first inductance element to be lit with a voltage having a square wave; a second inductance element provided between the DC power supply circuit section mad the DC-AC converter; a capacitor connected to an input stage of the DC-AC converter in series to the second inductance element; and current compensation means provided in parallel to the second inductance element in such a manner that when an input voltage to the DC-AC converter becomes smaller than an output voltage of the DC power supply circuit section, an amount of current supply to the DC-AC converter from the DC power supply circuit section is greater than an amount of current supply effected by the second inductance element.

According to this invention, the re-ignition voltage is compensated for by the resonance voltage with a high peak value which is produced by the coupling of the second inductance element and the resonance capacitor at the time the polarity of the square wave is inverted, and the current is compensated for by the current compensation means when the input voltage to the DC-AC converter becomes smaller than the output voltage of the DC power supply circuit section after the resonance in such a manner that the mount of the current supply to the DC-AC converter from the DC power supply circuit section becomes greater than the amount of the current supply by the second inductance element. This structure prevents the terminal potential of the resonance capacitor from rapidly falling due to the reaction of the resonance and prevents the lamp current from temporarily decreasing. It is therefore possible to considerably suppress the frequency of the lighting failure.

BRIEF DESCRIPTION OF THE DRAWINGS

FIG. 4 is an equivalent circuit diagram of the essential portions when FET's 24(1) and 24(4) are turned on;

DETAILED DESCRIPTION OF THE PREFERRED EMBODIMENT

A lighting circuit for a discharge lamp according to a preferred embodiment of the present invention will now be described in detail with reference to the accompanying drawings. In the illustrated embodiment, this invention is adapted for a lighting circuit for a vehicular discharge lamp.

Figure 1:
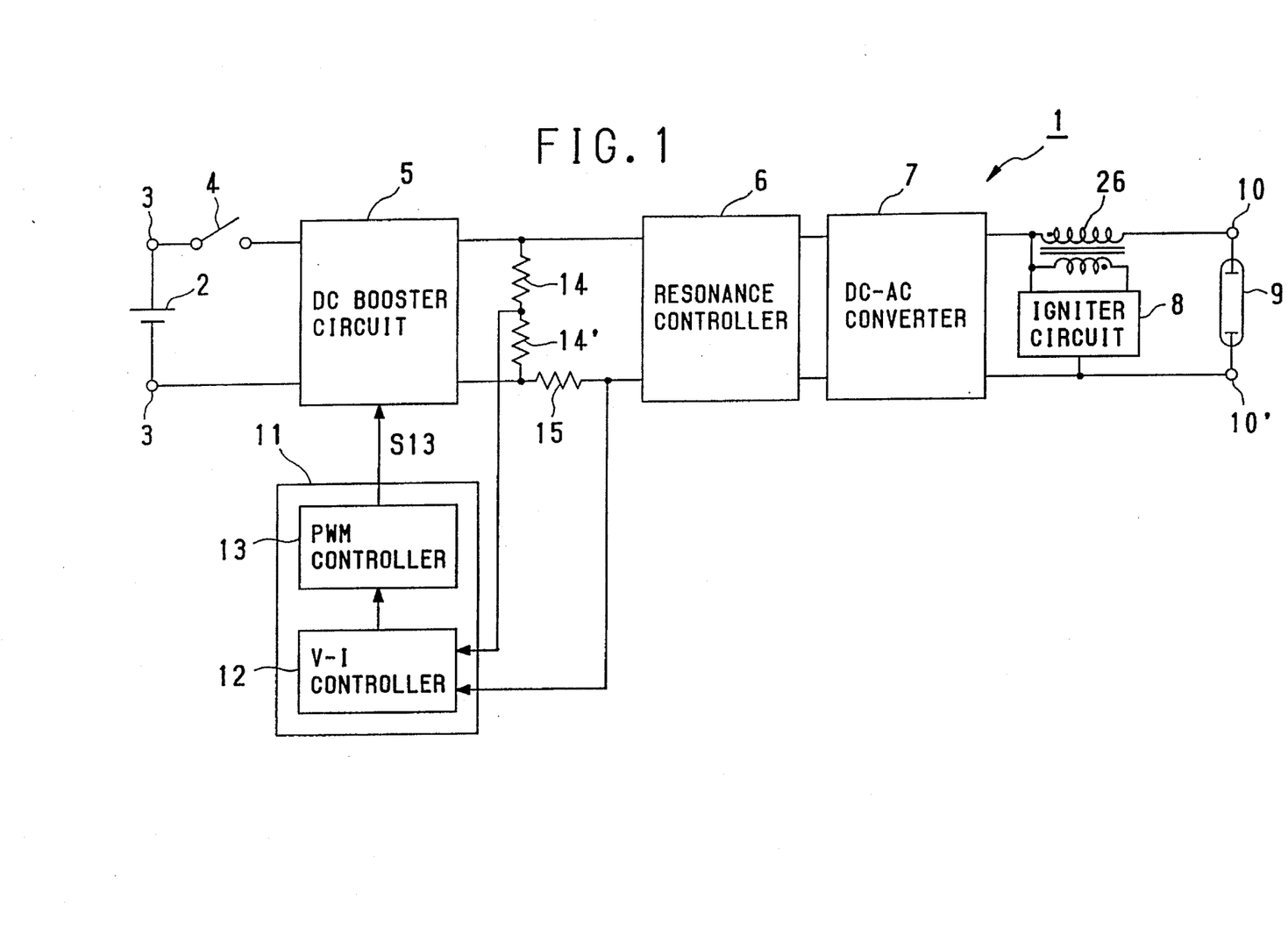
FIG. 1 is a circuit block diagram showing the structure of a lighting circuit for a discharge lamp according to this invention.

FIG. 1 is a circuit block diagram showing the general structure of a lighting circuit 1. A battery 2 is connected between DC voltage input terminals 3 and 3', and a lighting switch 4 is provided on the line connecting the positive input terminal of a DC booster circuit 5 and the DC voltage input terminal 3 (which is connected to the positive terminal of the battery 2). This DC booster circuit 5 is not limited to the type that controls voltage boosting, but may be designed to control both the boosting and stepping down of the voltage.

A resonance controller 6, provided at the subsequent stage of the DC booster circuit 5, has the function to compensate for the re-ignition voltage of the lamp by using the peak value of the resonance voltage at the time the polarity of the square wave is inverted.

A DC-AC converter 7 serves to convert the DC output voltage of the DC booster circuit 5 to a square-wave voltage as its output.

An igniter circuit 8 generates a trigger pulse when a metal halide lamp 9 is activated, superimposes this trigger pulse on the AC output of the DC-AC converter 7, and applies the resultant AC output to the metal halide lamp 9 which is connected between AC output terminals 10 and 10'.

A control circuit 11 controls the output voltage of the DC booster circuit 5. This control circuit 11 includes a V-I controller 12, which is associated with the voltage-current control of the lamp, and a PWM (Pulse Width Modulation) controller 13.

The V-I controller 12 is designed to perform the lighting control of the metal halide lamp 9 based on the control curve that defines the relationship between the lamp voltage and the lamp current. This V-I controller 12 employs a load line which is obtained by the linear approximation of a steady-power curve in the normal state. While the lamp voltage and lamp current can be detected directly, signals equivalent to the lamp voltage and lamp current are used in this embodiment to indirectly obtain detection signals.

The V-I controller 12 receives a voltage detection signal corresponding to the output voltage of the DC booster circuit 5, which is detected by voltage-dividing resistors 14 and 14' provided between the output terminals of the DC booster circuit 5, and also receives a current detection signal corresponding to the output current of the DC booster circuit 5. The current detection signal is input in the form of voltage via a current-detecting resistor 15, provided on the ground line that connects the DC booster circuit 5 to the DC-AC converter 7.

An instruction signal output from the V-I controller 12 is sent to the PWM controller 13, which produces a control signal (S13). This control signal S13 is fed back to the DC booster circuit 5.

Figure 2:
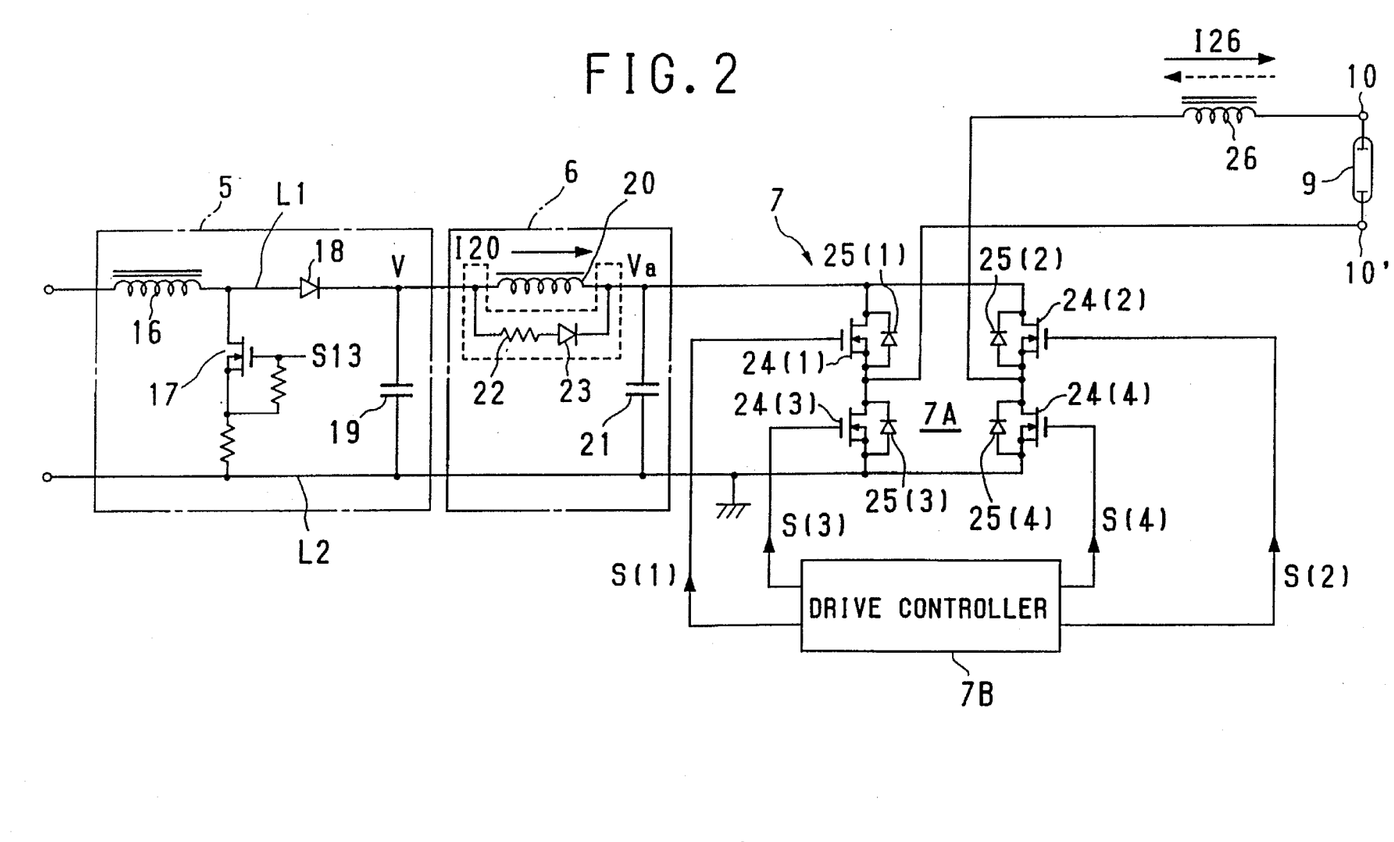
FIG. 2 is a circuit diagram showing the essential portions of the lighting circuit for a discharge lamp according to this invention.

FIG. 2 illustrates the circuit structures of the essential portions of the lighting circuit 1 in detail.

As illustrate& the DC booster circuit 5 has the form of a chopper type DC-DC converter, and comprises an inductor 16, provided on a positive line L1, an N channel FET 17, provided between the positive line L1 and a ground line L2, a rectifying diode 18 having its anode connected to the drain of the FET 17 on the positive line L1, and a smoothing capacitor 19 provided between the cathode of the diode 18 and the ground line L2. The switching of the FET 17 is controlled by the pulse S13 sent from the PWM controller 13.

When the FET 17 is turned on by the DC booster circuit 5 and the control pulse S13 from the PWM controller 13, the inductor 16 accumulates energy. When the YET 17 is turned off, the inductor 16 discharges the accumulated energy and a voltage equivalent to this energy is superimposed on the input voltage to the DC booster circuit 5 to accomplish the DC voltage boosting.

The resonance controller 6 has an inductor 20 provided on the positive line L1 and a capacitor 21. The inductor 20 has one end connected to the cathode of the diode 18 of the DC booster circuit 5 and the other end connected via the capacitor 21 to the ground line L2. The terminal voltage of the capacitor 21 is sent to the DC-AC converter 7. The capacitance of the capacitor 21 is selected to be smaller than that of the capacitor 19 at the output stage of the DC booster circuit 5. When a large current is supplied to the lamp at the initial stage of lighting to shorten the activation time of the lamp, a large current also flow across the inductor 20, undesirably making the peak voltage produced by the LC resonance too high. In this case, the inductor 20 should have a saturation characteristic, a Zener diode should be connected in parallel to the capacitor 21 to reduce the resonance peak voltage down to or below the breakdown voltage of the device, or some other proper measures should be taken.

A resistor 22 and a diode 23 are connected in series and they are in turn connected in parallel to the inductor 20. More specifically, one end of the resistor 22 is connected between the inductor 20 and the capacitor 19 and the other end of the resistor 22 is connected to the anode of the diode 23 whose cathode is connected between the inductor 20 and the capacitor 21.

The DC-AC converter 7 comprises a bridge type driver section 7A having four N channel FET's and a drive controller 7B which sends a switching control signal to those FET's.

Of the four N channel FET's 24(i) (i=1, 2, 3, 4) comprising the bridge type driver section 7A, the FET's 24(1) and 24(3) are connected in series, and the FET's 24(2) and 24(4) are connected in series. The first pair of FET's and the second pair of FET's are arranged in parallel to each other.

The upper-stage FET 24(1) of the first FET pair has a drain connected to the positive line L1 and a source connected to the drain of the lower-stage FET 24(3) whose source is connected to the ground line L2. The upper-stage FET 24(2) of the second FET pair has a drain connected to the positive line L1 and a source connected to the drain of the lower-stage FET 24(4) whose source is connected to the ground line L2.

Damper diodes 25(i) (i=1, 2, 3, 4) are each provided between the drain and source of the respective FET 24(i) (i=1, 2, 3, 4).

The output of the DC-AC converter 7 is obtained from between the FET's 24(1) and 24(3) and between the FET's 24(2) and 24(4). An inductor 26 is provided on the line that connects the node between the FET's 24(2) and 24(4) and the AC output terminal 10. This inductor 26 is equivalent to the secondary winding of a trigger transformer (not shown) provided in the igniter circuit 8 to produce an activation pulse to the metal halide lamp 9. At the time of activating the metal halide lamp 9, the pulse produced by a pulse generator in the igniter circuit 8 is boosted by the trigger transformer, but the activation pulse induced on the inductor 26 is superimposed on the output voltage of the DC-AC converter 7 and the resultant voltage is applied to the metal halide lamp 9.

It is preferable that the inductance (L26) of the inductor 26 be set smaller than the inductance (L20) of the inductor 20 (i.e., L26<L20). This is because that as L26 is smaller, the inclination of the lamp current at the time of inverting the polarity of the square wave becomes greater, so that the lighting failure of the lamp can be prevented by shortening the time for the lamp current to cross near the zero ampere point, and that the inductor 20 is provided to obtain a higher peak voltage value than the one produced by the inductor 26.

With regard to the switching control of the FET's 24(i), the drive controller 7B sends control signals S(i) (i=1, 2, 3, 4) to the respective FET's in such a way as to control two pairs of orthogonally arranged FET's in a reciprocal manner. Because the structure of the drive controller 7B does not directly relates to the subject matter of this invention, its illustration and description will not be given.

A description will now be given of the action of the resistor 22 and diode 23 (broken-lined block in FIG. 2) in the resonance controller 6 of the lighting circuit 1.

To begin with, the circuit operation when the resistor 22 and diode 23 are ignored will be discussed. Supposing that the FET's 24(2) and 24(3) are turned on before the inversion of the polarity of the square wave by the DC-AC converter 7, the current (I20) flowing across the inductor 20 and the current (I26) flowing across the inductor 26 run in the directions indicated by the solid-line arrows in FIG. 2.

Figure 3:
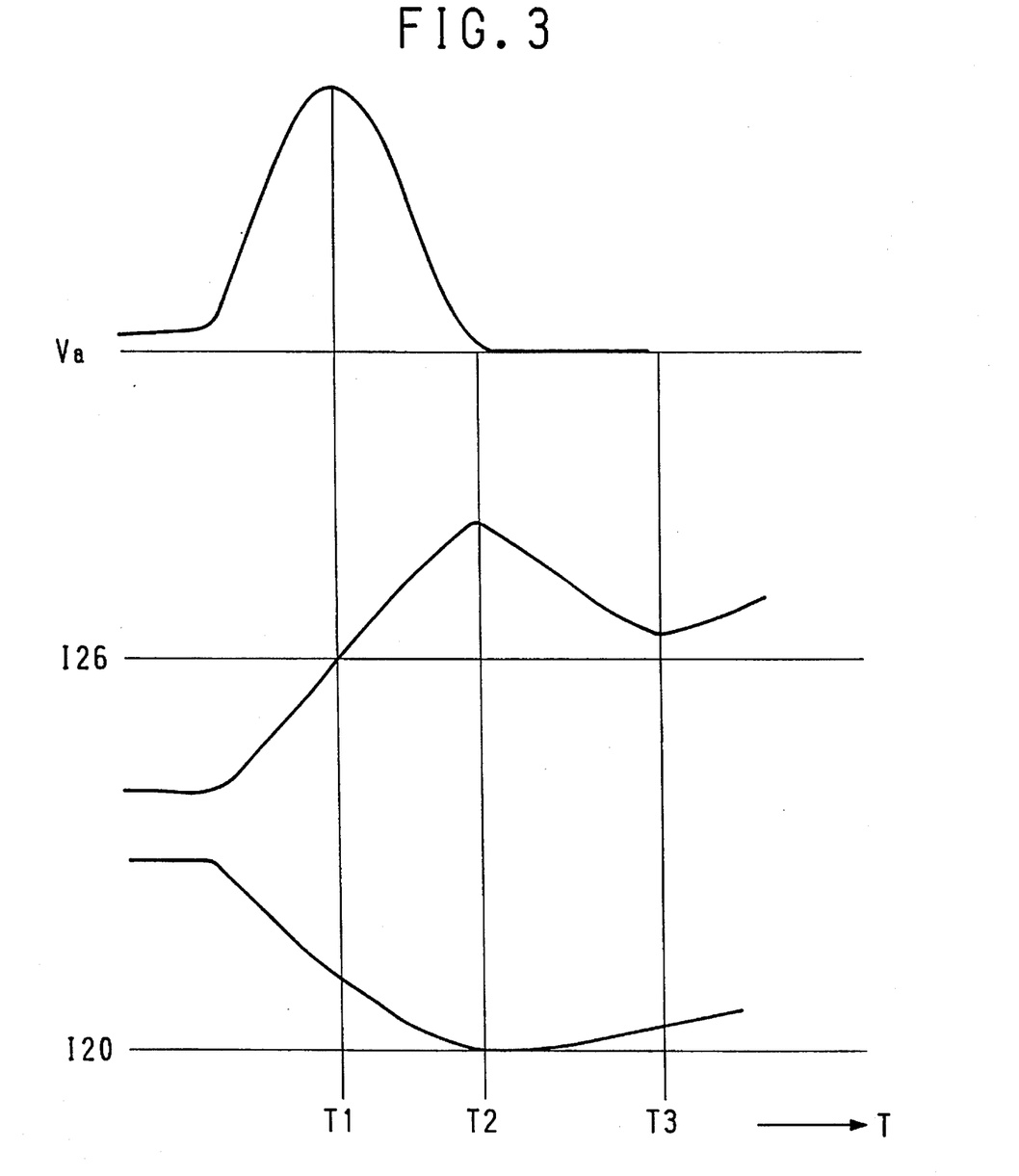
FIG. 3 is a diagram schematically showing waveforms at the essential portions for explaining the circuit operation when no current compensation means is provided.

FIG. 3 schematically shows the waveforms at the individual sections if the resistor 22 and diode 23 were not provided. This diagram shows the relationship among the potential (Va) between the inductor 20 and the capacitor 21 and the currents I26 and I20. In the diagram, "T" represents time, "T1" being the point indicating the peak value, "T2" the point at which Va rapidly falls close to zero, and "T3" the point at which I26 temporarily falls after T3.

When the FET's 24(2) and 24(3) are turned off (the FET's 24(1) to 24(4) are all turned off at this time), resonance occurs by the coupling of the inductor 20 and the capacitors 21 and 19 with respect to I20 and resonance occurs by the coupling of the inductor 26 and the capacitor 21 via the diodes 25(1) and 25(4) with respect to I26, thereby increasing the potential Va.

Figure 4:
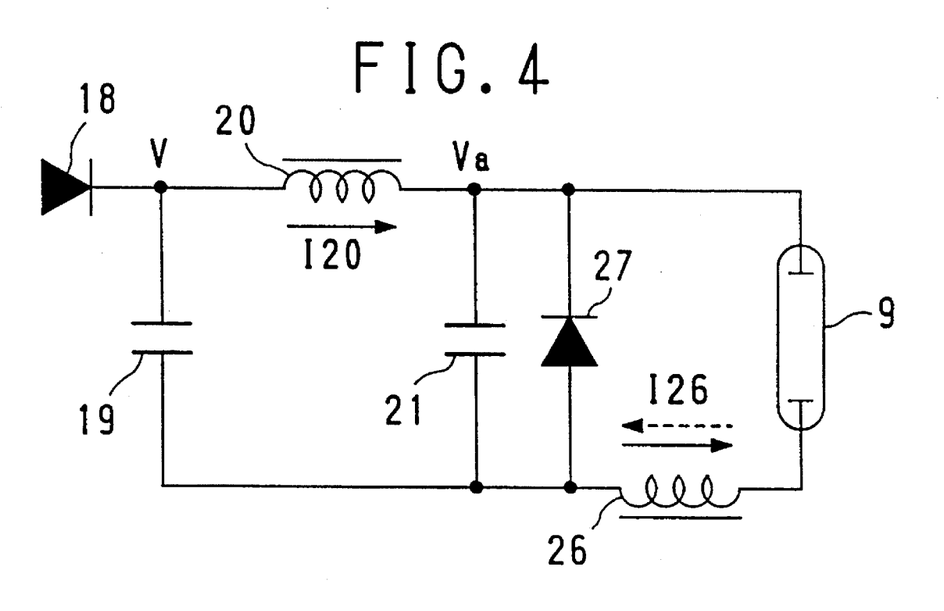

When the FET's 24(1) and 24(4) are turned on thereafter, the circuit becomes equivalent to the circuit shown in FIG. 4. That is, a circuit closed by the inductor 20 and the capacitors 21 and 19 and a circuit closed by the metal halide lamp 9, the inductor 26 and the diode 27 (equivalent to the aforementioned diodes 25(2) and 25(3)) are formed.

When the potential Va rises, increasing the current I26, and shows the peak at T1 at which the polarity of the current I26 is inverted, the direction of the current I26 becomes the one indicated by the broken line in FIG. 2 or FIG. 4. Such a timing can be defined by properly setting the inductance of the inductor 20 and the capacitance of the capacitor 21.

After T1, Va drops and I26 rises, but when Va fails close to zero at T2, I20 will stop flowing.

During the period where Va falls close to zero (T2≦T≦I3), I26 decreases with time and reaches the minimum at T3.

After T2, I20 linearly rises with a certain inclination (I20=(V/L).t where V is the output voltage of the DC booster circuit 5, t is the time passed from T2 and L is the inductance of the inductor 20). Until T3 is reached, however, the capacitor 21 is not charged and I20 flows in the direction indicated by the solid-line arrow in FIG. 2 or FIG. 4 and I26 flows through the closed circuit passing the diode 27 and metal halide lamp 9 as indicated by the broken-line arrow in FIG. 4. When I20 becomes equal to I26 at T3, the capacitor 21 is charged by I20 thereafter, raising Va, and I26 turns to rise after T3.

It is apparent from the above that as Va drops dose to zero by the reaction of the resonance after reaching the resonance peak at T1, the current supply associated with I26 does not proceed. To avoid this shortcoming, the amount of current supply greater than the current supply by the inductor 20 should be effected when Va becomes smaller than the output voltage V of the DC booster circuit 5.

In this embodiment the resistor 22 (having a resistance R22) and diode 23 (whose forward voltage drop is Vf) are connected in parallel to the inductor 20, so that the current flowing the diode 23 (indicated by "I23") becomes I23= (V−Va−Vf)/R22. It is apparent from this equation that the greater the potential difference V−Va becomes, the greater the amount of current can be supplied. It is thus possible to prevent the sharp drop of Va from occurring by the resonance reaction and prevent I26 from temporarily falling at T3. Because the effective resistance of the inductor 20 is set smaller than R22, the current flowing to the DC-AC converter 7 from the resonance controller 6 after the resonance will gradually shift toward I20 from I23.

Figure 5A:
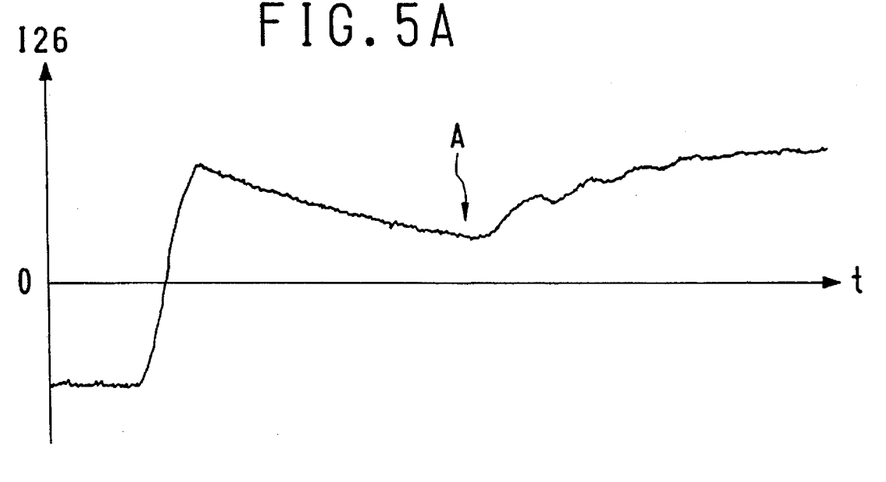
FIGS. 5A and 5B are waveform charts showing a current I26 flowing across an inductor 26, FIG. 5A showing the waveform when no current compensation means is provided while FIG. 5B showing the waveform when current compensation means is provided.
Figure 5B:
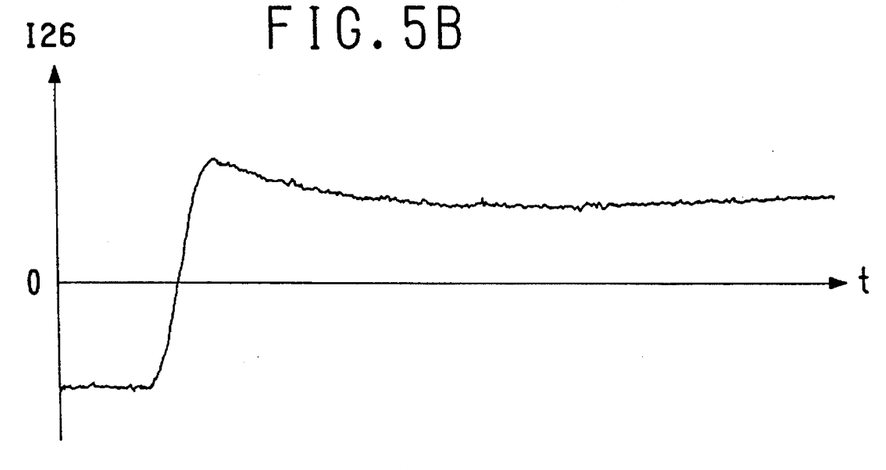

FIG. 5 presents waveform charts showing an observed change in I26 with the passage of time at the time the polarity of the square wave is inverted at the initial lighting stage. FIG. 5A shows the waveform when the resistor 22 and diode 23 are not provided, and FIG. 5B shows the waveform when the resistor 22 and diode 23 are provided.

It is apparent from the comparison between both waveforms that the temporary drop of I26 (see the arrow A in FIG. 5A) observed when the resistor 22 and diode 23 are not provided is not seen at all when the resistor 22 and diode 23 are provided as shown in FIG. 5B. It is therefore possible to prevent the lighting failure of the metal halide lamp 9.

Although the series of the resistor 22 and diode 23 is connected fit parallel to the inductor 20 in this embodiment, this invention is not limited to this particular connection. The advantages of this invention can be maintained as long as the circuit is designed in such a way that a larger mount of current than the current supply made by the inductor 20 can be supplied when Va becomes lower than the output voltage V of the DC booster circuit 5.

Figure 6:
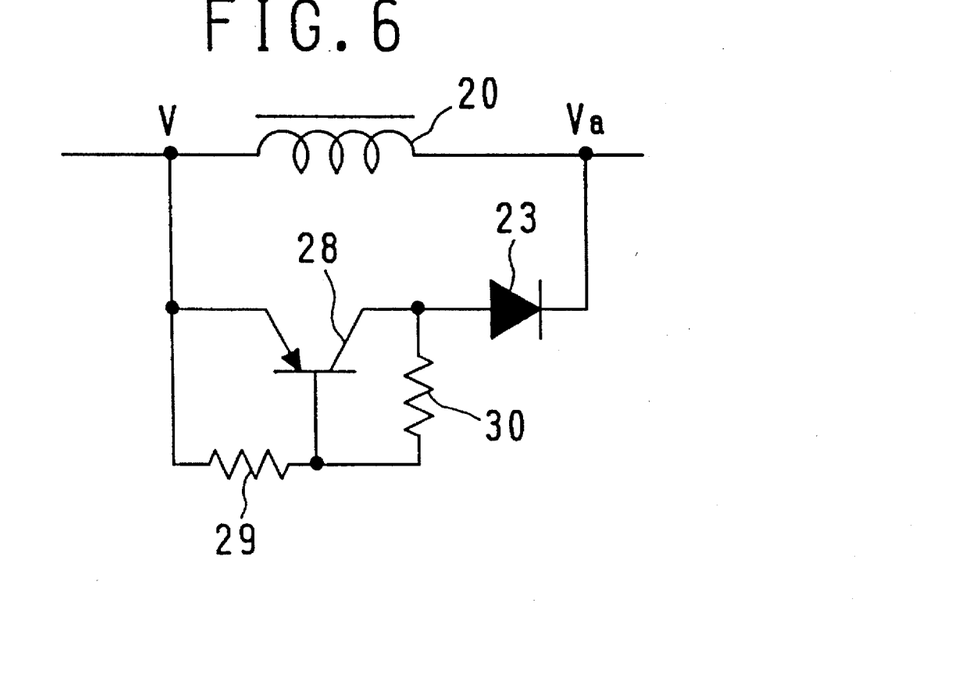
FIG. 6 is a diagram showing a modification of the current compensation means.
Figure 7:
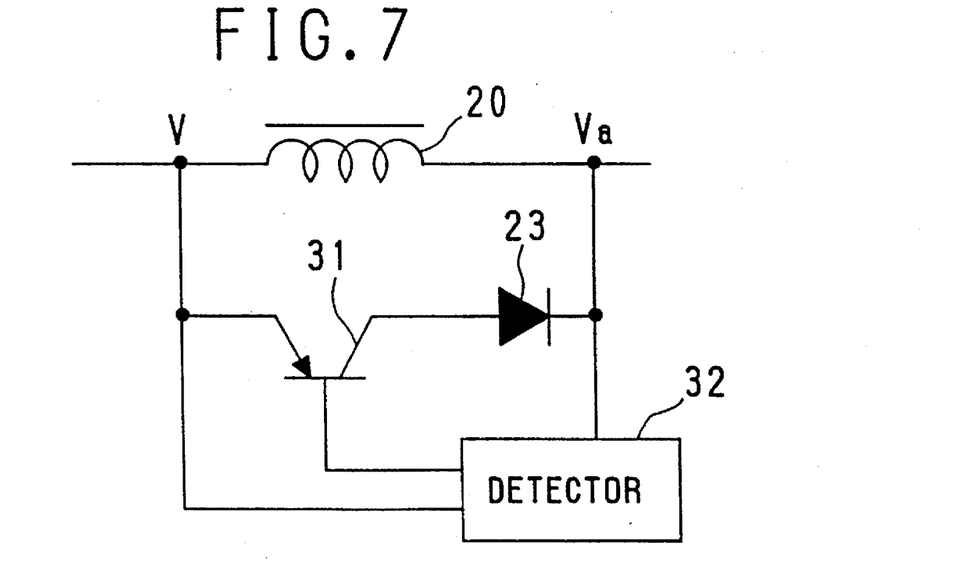
FIG. 7 is a diagram showing another modification of the current compensation means different from the one shown in FIG. 6.

For example, as shown in FIG. 6, a PNP transistor 28 and the diode 23 may be provided in parallel to the inductor 20 in such a form that the emitter of the transistor 28 is connected to one end of the inductor 20 on the DC booster circuit 5 side, the collector of the transistor 28 is connected to the anode of the diode 23 whose cathode is connected to the other end of the inductor 20 on the DC-AC converter 7 side, with resistors 29 and 30 respectively inserted between the base and emitter of the transistor 28 and between the base and collector thereof. In this case, a change in resistance according to the potential difference V–Va is obtained by using the active region of the transistor 28, and a larger current can be supplied as V–Va becomes larger. As another example, as shown in FIG. 7, a transistor 31 and the diode 23 may be provided in parallel to the inductor 20 and a detector 32 for obtaining the potential difference V–Va or a detection signal equivalent to this potential difference may be provided so as to output a signal to the base of the transistor 31. This illustrated arrangement can control the current supply in such a manner that a larger current can be supplied as V–Va grows larger.

In short, according to this invention as recited in claim 1, the resonance voltage with a high peak is obtained by the LC resonance of the second inductance element (equivalent to the inductor 20 in this embodiment) and the resonance capacitor (equivalent to the capacitor 21 in this embodiment) at the time the polarity of the square wave is inverted, the re-ignition voltage is compensated for by this resonance voltage, and the necessary current can be supplemented by causing the current compensation means (equivalent to the resistor 22, diode 23, etc. in this embodiment) to make the amount of the current supply to the DC-AC converter from the DC power supply circuit section greater than the mount of the current supply by the second inductance element, when the input voltage to the DC-AC converter becomes smaller than the output voltage of the DC power supply circuit section after the resonance. This approach can prevent the terminal potential of the resonance capacitor from rapidly filling due to the reaction of the resonance and can prevent the lamp current from temporarily decreasing.

It is therefore possible to considerably suppress the frequency of the lighting failure of the lamp at the initial lighting stage or the like. This circuit structure is simpler than the conventional circuit structure which does not immediately supply a square-wave voltage to the discharge lamp, but supplies a DC voltage thereto over a predetermined period of time and then switches the DC voltage to a square-wave voltage in order to stabilize the lighting status of the discharge lamp at the initial lighting stage. Further, this circuit structure affects less the life of the electrodes of the discharge lamp than the conventional structure.

According to the invention recited in claim 2, the current compensation means has a semiconductor switch element, which conducts only in the direction from the DC power supply circuit section to the DC-AC converter, and a resistor, thereby contributing to the simplification of the circuit structure.

According to the invention recited in claim 3, the inductance of the second inductance element is set greater than the inductance of the first inductance element to ensure a resonance voltage with a sufficient peak value with respect to the re-ignition voltage of the discharge lamp.

What is claimed is:
1. A lighting circuit for a discharge lamp comprising:
   a DC power supply circuit section including a smoothing capacitor;
   a bridge type DC-AC converter provided at a subsequent stage of said DC power supply circuit section;
   a first inductance element provided at a subsequent stage of said DC-AC converter with a discharge lamp connected in series to said first inductance element to be lit with a voltage having a square wave;
   a second inductance element provided between said DC power supply circuit section and said DC-AC converter;
   a capacitor connected to an input stage of said DC-AC converter in series to said second inductance element; and
   current compensation means provided in parallel to said second inductance element in such a manner that when an input voltage to said DC-AC converter becomes smaller than an output voltage of said DC power supply circuit section, an amount of current supply to said DC-AC converter from said DC power supply circuit section is greater than an amount of current supply effected by said second inductance element.

2. The lighting circuit according to claim 1, wherein said current compensation means has a semiconductor switch element, which conducts only in a direction from said DC power supply circuit section to said DC-AC converter, and a resistor.

3. The fighting circuit according to claim 1 or 2, wherein an inductance of said second inductance element is greater than an inductance of said first inductance element.

4. The lighting circuit according to claim 3, wherein said semiconductor switch element is a diode connected in series to said resistor.

5. The lighting circuit according to claim 4, wherein said resistor includes a PNP transistor having a base, an emitter connected to one end of said second inductance element and a collector connected to an anode of said diode having a cathode connected to the other end of said second inductance element, and two resistors respectively connected between said base and emitter of said PNP transistor and between said base collector thereof.

6. The lighting circuit according to claim 4, wherein said resistor is a transistor and a voltage detector is further provided for obtaining a voltage difference between a voltage at one end of said second inductance element and a voltage at the other end thereof or a detection signal equivalent to said voltage difference and sending an output signal of said voltage detector to a base of said transistor.

7. The lighting circuit according to claim 1, wherein said DC-AC converter comprises a bridge type driver section having four N channel field-effect transistors, and a drive control section for sending a switch control signal to said N channel field-effect transistors.

8. The lighting circuit according to claim 7, wherein said N channel field-effect transistors include a first pair of transistors connected in series to each other and a second pair of transistors connected in series to each other, said first pair of transistors being arranged in parallel to said second pair of transistors.

9. The lighting circuit according to claim 7, wherein said driver section further includes four damper diodes respectively connected between drains and sources of said four N channel field-effect transistors.

10. The lighting circuit according to claim 1, wherein said first inductance element is a secondary winding of a trigger transformer provided in an igniter circuit provided at a subsequent stage of said DC-AC converter.

11. The lighting circuit according to claim 9, wherein said first inductance element is connected between a node between said second pair of transistors and an AC output terminal.

* * * * *